Kirkman & Gray,
Subsoil Plow.
No. 66,031.  Patented June 25, 1867.
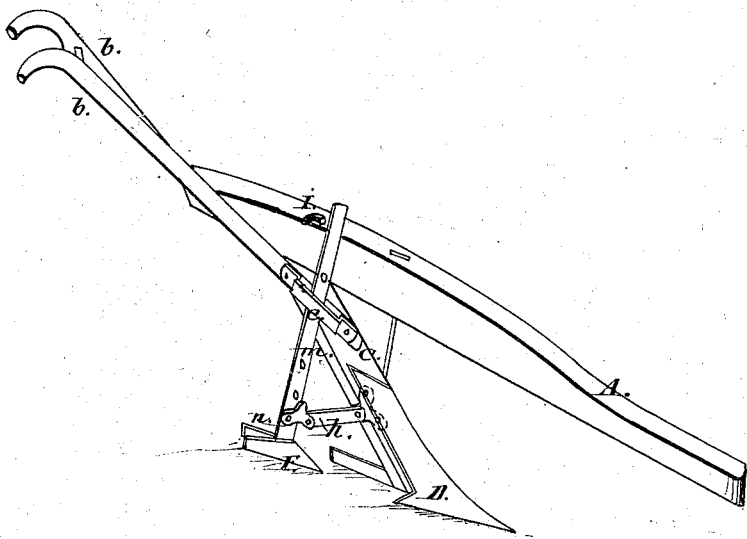
WITNESSES:
F. Schmann
Jno. A. Ellis
INVENTORS.
D. J. Kirkman
E. H. Gray
per
J. H. Alexander & Co
Attorneys

United States Patent Office.

D. J. KIRKMAN AND E. H. GRAY, OF WINCHESTER, ILLINOIS.

Letters Patent No. 66,031, dated June 25, 1867.

---

IMPROVEMENT IN PLOUGHS.

---

*The Schedule referred to in these Letters Patent and making part of the same.*

---

TO ALL WHOM IT MAY CONCERN:

Be it known that we, J. D. KIRKMAN and E. H. GRAY, of Winchester, in the State of Illinois, have invented certain new and useful Improvements in Subsoil Ploughs; and we hereby declare that the following is a true, full, and exact description of the same, reference being had to the accompanying drawings, and to the letters of reference marked thereon. In the annexed drawing—

Figure I represents a perspective view of my plough.

A represents the beam, $b\ b$ the handles, and C the standard, to which the share D is attached. To the handle $b$ on the right-hand side is fastened the cleat $e$, between which and the plough-handle the bar $m$ is designed to pass. The bar $m$ is operated at its lower end by means of the double-jointed bar $h$, one elbow of the arm or bar $h$ being made to embrace the bar $m$, and the other elbow being fastened to standard C. The elbow that embraces the bar $m$ is perforated so as to admit of a bolt, $n$, passing through it and through corresponding holes in bar $m$. To the lower end of bar $m$ the subsoil plough F is firmly secured, and can be set as deep in the earth or as near the surface as the operator may desire, by adjusting the bolt which passes through bar $m$ to any desired hole. When the subsoil plough is set to the required depth it will be held immovably in that position by passing the hook $i$ through a hole in bar $m$, the hook being made to play on a bolt which confines it to the top of the plough-beam. It will be observed that the subsoil plough follows the furrow of the plough which precedes it, and thus breaks up the soil to the required depth.

Having thus described my invention, what I claim, and desire to secure by Letters Patent, is—

1. The employment of a subsoil plough, F, when attached to the adjustable bar $m$, said bar being constructed and arranged in the manner herein specified.

2. The adjustable bar $m$, double-jointed arm $h$, and hook $i$, the whole combined in the manner and for the purpose set forth.

In testimony that we claim the foregoing we set our signature in presence of two witnesses.

D. J. KIRKMAN,
E. H. GRAY.

Witnesses:
L. C. SALLEE,
WM. H. WATT.